(12) United States Patent
Tsuzuki et al.

(10) Patent No.: US 10,682,608 B2
(45) Date of Patent: Jun. 16, 2020

(54) BASE MATERIAL-INTEGRATED NANOCRYSTALLINE METAL OXIDE COMPOSITE-CONTAINING CATALYST, METHOD FOR MANUFACTURING THE SAME, AND CATALYST COMPONENT

(71) Applicant: Furukawa Electric Co., Ltd., Tokyo (JP)

(72) Inventors: Yoshikazu Tsuzuki, Tokyo (JP); Kenji Iizuka, Tokyo (JP); Mariko Wakae, Tokyo (JP); Kazuhiko Kurusu, Tokyo (TW)

(73) Assignee: Furukawa Electric Co., Ltd., Tokyo (JP)

( * ) Notice: Subject to any disclaimer, the term of this patent is extended or adjusted under 35 U.S.C. 154(b) by 39 days.

(21) Appl. No.: 15/870,426

(22) Filed: Jan. 12, 2018

(65) Prior Publication Data
US 2018/0133649 A1 May 17, 2018

Related U.S. Application Data

(63) Continuation of application No. PCT/JP2016/070613, filed on Jul. 12, 2016.

(30) Foreign Application Priority Data

Jul. 15, 2015 (JP) ................... 2015-141696

(51) Int. Cl.
*B01J 23/72* (2006.01)
*B01J 23/75* (2006.01)
(Continued)

(52) U.S. Cl.
CPC .............. *B01D 53/94* (2013.01); *B01J 23/72* (2013.01); *B01J 23/89* (2013.01); *B01J 23/8926* (2013.01);
(Continued)

(58) Field of Classification Search
CPC ... B01J 35/02; B01J 23/72; B01J 23/75; B01J 23/755; B01J 23/89; B82Y 30/00
See application file for complete search history.

(56) References Cited

U.S. PATENT DOCUMENTS

| | | |
|---|---|---|
| 3,617,518 A | 11/1971 | Sinfelt et al. |
| 5,439,859 A | 8/1995 | Coggins et al. |
| (Continued) | | |

FOREIGN PATENT DOCUMENTS

| | | |
|---|---|---|
| CN | 104368345 A | 2/2015 |
| JP | S496523 B1 | 2/1974 |
| (Continued) | | |

OTHER PUBLICATIONS

English Translation of the Written Opinion dated Sep. 20, 2016 for PCT Application No. PCT/JP2016/070613.
(Continued)

*Primary Examiner* — Cam N. Nguyen
(74) *Attorney, Agent, or Firm* — Dorsey & Whitney LLP (57) ABSTRACT

A catalyst includes: a base material; and a nanocrystalline metal oxide composite having a plurality of accumulated flake-like nanocrystalline pieces in a connected state on the surface of the base material, the flake-like nanocrystalline pieces containing a metal oxide to accumulate, wherein the nanocrystalline metal oxide composite is configured such that an end surface of at least one of the nanocrystalline pieces is connected; the nanocrystalline pieces include a plurality of stacked surfaces stacked in a direction in which a main surface becomes an uppermost stacked surface; and when metal atoms or oxygen atoms forming the metal oxide are regarded as main constituent atoms, a proportion by number of the main constituent atoms to the metal atoms and the oxygen atoms forming the metal oxide existing on each stacked surface is 80% or more, and the main constituent (Continued)

atoms have a specific crystal orientation which changes in each stack.

9 Claims, 5 Drawing Sheets

(51) Int. Cl.
| | |
|---|---|
| B01J 23/755 | (2006.01) |
| B01J 23/89 | (2006.01) |
| B01J 35/02 | (2006.01) |
| B82Y 30/00 | (2011.01) |
| B01D 53/94 | (2006.01) |
| B01J 37/08 | (2006.01) |
| B01J 37/02 | (2006.01) |
| B01J 35/04 | (2006.01) |
| B01J 35/00 | (2006.01) |

(52) U.S. Cl.
CPC ............ *B01J 35/0013* (2013.01); *B01J 35/02* (2013.01); *B01J 35/023* (2013.01); *B01J 35/026* (2013.01); *B01J 35/04* (2013.01); *B01J 37/0215* (2013.01); *B01J 37/08* (2013.01); *B01J 37/088* (2013.01); *B82Y 30/00* (2013.01)

(56) References Cited

U.S. PATENT DOCUMENTS

| | | | | |
|---|---|---|---|---|
| 6,162,530 | A * | 12/2000 | Xiao | B82Y 30/00 428/292.1 |
| 7,166,263 | B2 * | 1/2007 | Vanderspurt | B01J 23/002 423/263 |
| 7,612,011 | B2 * | 11/2009 | Vanderspurt | B01J 23/002 502/302 |
| 7,871,957 | B2 * | 1/2011 | Willigan | B01J 23/002 423/247 |
| 8,790,614 | B2 | 7/2014 | Richards et al. | |
| 2004/0038808 | A1 | 2/2004 | Hampden-Smith et al. | |
| 2010/0071179 | A1 | 3/2010 | Koizumi et al. | |
| 2013/0142726 | A1 | 6/2013 | Biniwale et al. | |
| 2014/0186253 | A1 | 7/2014 | Kitagawa et al. | |
| 2015/0086871 | A1 | 3/2015 | Cao et al. | |
| 2018/0134550 | A1 | 5/2018 | Tsuzuki et al. | |

FOREIGN PATENT DOCUMENTS

| | | |
|---|---|---|
| JP | H07300431 A | 11/1995 |
| JP | 2001198469 A | 7/2001 |
| JP | 2006130378 A | 5/2006 |
| JP | 2006524898 A | 11/2006 |
| JP | 2007269522 A | 10/2007 |
| JP | 2010100515 A | 5/2010 |
| JP | 2013240756 A | 12/2013 |
| JP | 2014104451 A | 6/2014 |
| WO | 2004095603 A2 | 11/2004 |
| WO | 2013021944 A9 | 5/2013 |

OTHER PUBLICATIONS

English Translation of International Preliminary Report on Patentability Chapter I dated Jan. 16, 2018 for PCT App. No. PCT/JP2016/070613.

International Search Report and Written Opinion dated Sep. 13, 2016 for PCT Application No. PCT/JP2016/070613 (with English Translation of ISR/WO).

U.S. Appl. No. 15/870,450, entitled "Nanocrystalline Composite Catalyst For Storing/Supplying Hydrogen, Nanocrystalline Composite Catalyst Mixture for Storing/Supplying Hydrogen, and Method for Supplying Hydrogen", filed Jan. 12, 2018.

Biniwale, R.B., et al., Dehydrogenation of Cyclohexane Over Ni Based Catalysts Supported on Activated Carbon Using Spray-Pulsed Reactor and Enhancement in Activity by Addition of a Small Amount of PT, Catalysis Letters, vol. 105, No. 1, Nov. 2005, pp. 83-87.

Patil, S.P., et al., Non-Noble Ni—Cu/AcC Bimetallic Catalyst for Dehydrogenation of Liquid Organic Hydrides for Hydrogen Storage, International Journal of Hydrogen Energy, vol. 38, No. 35, Oct. 10, 2013, pp. 15233-15241.

Vaseem, et al., Flower-Shaped CuO Nanostructures: Structural, Photocatalytic and Xanes Studies, Catalysis Communications, vol. 10, No. 1, Jul. 29, 2008, pp. 11-16.

Zhu, et al., Self-Assembled 3D Flower-Like Hierarchical β-Ni(OH)2 Hollow Architectures and Their in Situ Thermal Conversion to NiO, Nanoscale Research Letters, vol. 4, pp. 550-557, Feb. 27, 2009.

English Translation of Japanese publication No. 2006130378.

English Translation of Japanese publication No. 2013240756A.

Extended European Search Report dated Jan. 3, 2019 for European Application No. 16824472.1.

Office Action received in European Application No. 16824472.1 dated Nov. 21, 2019.

English Translation of Notice of Reasons for Refusal received in JP Application No. 2017-528696 dated Apr. 9, 2020.

* cited by examiner

BASE MATERIAL-INTEGRATED NANOCRYSTALLINE METAL OXIDE COMPOSITE-CONTAINING CATALYST, METHOD FOR MANUFACTURING THE SAME, AND CATALYST COMPONENT

CROSS REFERENCE TO RELATED APPLICATIONS

This is a continuation application of International Patent Application No. PCT/JP2016/070,613 filed Jul. 12, 2016, which claims the benefit of Japanese Patent Application No. 2015-141,696 filed Jul. 15, 2015, the full contents of all of which are hereby incorporated by reference in their entirety.

BACKGROUND

Technical Field

The present disclosure relates to a base material-integrated nanocrystalline metal oxide composite-containing catalyst, a method for manufacturing the same, and a catalyst component.

Description of the Related Art

Generally, a catalyst means a substance which changes the reaction velocity of a substance system providing a chemical reaction without chemically changing itself. Examples of a catalyst component using a catalyst include a catalytic converter used in order to clean exhaust gases discharged from an automobile engine.

Usually, the catalytic converter mainly includes a case made of a metal material such as stainless steel, a carrier stored in the case, having a cell structure, and generally made of a porous ceramic material, and a holding material mat disposed so as to cover the periphery of the carrier. The carrier is manufactured by a so-called wash coat treatment for immersion into an aqueous solution in which catalyst particles or ceramic particles made of alumina ($Al_2O_3$), silica ($SiO_2$) and the like are dispersed, followed by pulling up and drying or firing (sintering). The carrier has a structure where catalyst particles, or ceramic particles such as alumina particles are supported on the wall surface of a cell.

It is general to use, as catalyst particles, precious metal catalysts such as platinum (Pt), rhodium (Rh), and palladium (Pd) and the like. However, since the precious metal catalyst is expensive, and has a resource depletion problem, recently, attempts have been positively made to reduce the amount of the precious metal catalyst to be used.

As means for reducing the amount of the precious metal catalyst to be used, for example, by making catalyst particles finer to nanoparticles having a nanometer scale particle diameter of less than 1 μm, it is useful to increase the area (surface area) ratio of a catalyst surface (active surface) producing a catalyst reaction, or to substitute an inexpensive transition metal or oxide thereof for a part of the precious metal catalyst.

However, when the precious metal catalyst is merely made finer to the nanoparticles without controlling the surface quality of the catalyst, and the nanoparticles have a smooth spherical surface, the surface area of the catalyst particle cannot be effectively increased. A part of the surface of the catalyst particle (for example, a lower half part of the surface of the catalyst particle) is usually supported on the surface of the carrier, or in a state of being buried in the surface of an alumina particle supported on the carrier, and becomes a supported surface which cannot produce a function as an active surface. The supported surface certainly exists at a certain level of area ratio (for example, about 10 to 50% of the total surface area of the catalyst particle), which causes the following problem: the surface area of the active surface of the actual catalyst particle cannot be desirably increased.

For this reason, the surface area of the supported surface of the catalyst particle is preferably narrowed as much as possible from the viewpoint of increasing the number of active points. When the supported surface is excessively narrowed, a support strength is insufficient, which causes the catalyst particle to readily detach from the surface of the carrier, as a result of which sufficient catalyst activity is not obtained. This requires a catalyst which provides a support strength preventing the detachment of the catalyst particle from the carrier, and has a surface quality capable of securing the area (surface area) of a sufficient active surface.

For example, Japanese Laid-Open Patent Publication No. 2013-240756 (JP 2013-240756A) discloses that a single nanocrystalline board-accumulative catalyst (nanoflower) is developed, in which single nanocrystalline boards each having a specific surface of a specific single crystal regarded as one surface are accumulated without facing and contacting the catalyst active surfaces between adjacent single nanocrystalline boards. JP 2013-240756A also discloses that: by using the catalyst, a space (void portion) is secured in front of the catalyst active surface without facing and contacting the catalyst active surfaces even during thermal aggregation; deterioration in the catalyst activity caused by the thermal aggregation can be suppressed; and catalyst activity can be improved. JP 2013-240756A further discloses that by using a CuO single nanocrystalline board which has a catalyst active surface as a (001) plane and is a transition metal oxide, as the single nanocrystalline board, the material cost of the catalyst can be reduced.

However, the single nanocrystalline board-accumulative catalyst described in JP 2013-240756A has a structure where the adjacent single nanocrystalline boards merely accumulate. This causes the following problems: a binding strength between the adjacent single nanocrystalline boards of the single nanocrystalline board-accumulative catalyst is weak; the single nanocrystalline board forming the single nanocrystalline board-accumulative catalyst readily detaches even under small vibration or impact; and the single nanocrystalline board-accumulative catalyst readily breaks without remaining the shape of the single nanocrystalline board-accumulative catalyst itself.

A method for manufacturing the single nanocrystalline board-accumulative catalyst described in JP 2013-240756A is a method for manufacturing a single nanocrystalline board-accumulative catalyst by a hydrothermal reaction in a sealing state where a mixed solution obtained by mixing $CuCl_2$ and urea with an aqueous solution containing an organic solvent such as ethylene glycol of 50 mol % or less is disposed in a pressure vessel. The method requires a long reaction time of 10 hours or more, and is a manufacturing method in a sealing state using the pressure vessel. Therefore, the method has the following industrial production problems: it is difficult to manufacture the single nanocrystalline board-accumulative catalyst; and only a small amount of the single nanocrystalline board-accumulative catalyst can be manufactured per manufacture, which causes poor mass productivity.

SUMMARY

The present disclosure is related to providing a base material-integrated nanocrystalline metal oxide composite-containing catalyst, which has a base material and a plurality of accumulated flake-like nanocrystalline pieces with a main surface having a specific crystal orientation and containing a metal oxide in a connected state on the surface of the base material in a predetermined positional relationship, and in which the surface area of a main surface (active surface) can be effectively enlarged; nanocrystalline pieces do not readily detach, the entire shape thereof can be maintained and excellent catalytic activity is exhibited even if a force caused by vibration or impact acts on the nanocrystalline pieces.

The present disclosure is also related to providing a method for manufacturing a base material-integrated nanocrystalline metal oxide composite-containing catalyst which shortens a manufacturing time to allow mass production when a seed crystal material is used as a base material.

The present disclosure is also related to providing a catalyst component, in which a portion of a base material and the like forming the catalyst is connected to a carrier to allow a metal oxide composite to be supported on the carrier by a sufficient support strength with a supported portion having a comparatively narrow surface area ratio, and the surface area of a main surface (active surface) of a nanocrystalline piece forming the metal oxide composite can be effectively enlarged and excellent catalytic activity can be exhibited.

The present inventors have studied reduction in the amount of a precious metal catalyst to be used, and have found that, by substituting a metal oxide catalyst for at least a part of the precious metal catalyst, making the metal oxide catalyst finer to nanoparticles, constituting the metal oxide catalyst using a base material, and accumulating a plurality of flake-like nanocrystalline pieces containing a metal oxide having a main surface having a specific crystal orientation in a connected state on the surface of the base material in a predetermined positional relationship to form a nanocrystalline metal oxide composite, the surface area of the main surface (active surface) can be effectively enlarged; nanocrystalline pieces connected to the base material do not readily detach, the entire shape of the metal oxide catalyst can be maintained and excellent catalytic activity is exhibited even if a force caused by vibration or impact acts on the nanocatalytic particles.

A first aspect of the present disclosure includes a base material-integrated nanocrystalline metal oxide composite-containing catalyst, the catalyst including: a base material; and a nanocrystalline metal oxide composite having a plurality of accumulated flake-like nanocrystalline pieces in a connected state on a surface of the base material, the flake-like nanocrystalline pieces each having a main surface and an end surface and containing a metal oxide, wherein: the nanocrystalline metal oxide composite is configured such that, when two adjacent nanocrystalline pieces are viewed, an end surface of at least one of the nanocrystalline pieces is connected; the nanocrystalline pieces include a plurality of stacked surfaces stacked in a direction in which the main surface becomes an uppermost stacked surface; and when metal atoms or oxygen atoms forming the metal oxide are regarded as main constituent atoms, a proportion by number of the main constituent atoms to the metal atoms and the oxygen atoms forming the metal oxide existing on each stacked surface is 80% or more, and the main constituent atoms have a specific crystal orientation which changes in each stack.

It may be preferable that a metal forming the metal oxide contains one or two or more selected from Cu, Ni, Co, and Zn.

It may be preferable that the base material-integrated nanocrystalline metal oxide composite-containing catalyst further includes a nanocrystalline metal body containing one or two or more metals or alloys selected from Pd, Rh, Ru, Pt, Ag, and Au.

It may be preferable that a percentage of an area of the main surface of the nanocrystalline piece covered by connection thereof to another adjacent nanocrystalline piece is in the range of 5 to 20%.

It may be preferable that the nanocrystalline metal oxide composite is configured such that the plurality of nanocrystalline pieces are in a dendrite-like connected state.

It may be preferable that the base material is a seed crystal material having a surface promoting growth of the nanocrystalline piece so that the main surface of the nanocrystalline piece has a specific crystal orientation.

A second aspect of the present disclosure includes a method for manufacturing the base material-integrated nanocrystalline metal oxide composite-containing catalyst, the method including the step of preferentially growing the nanocrystalline piece from a surface of the base material to accumulate the plurality of nanocrystalline pieces in a connected state on the surface of the base material to integrally form the nanocrystalline metal oxide composite, for example, when a seed crystal material is used as a base material.

The third aspect of the present disclosure includes a catalyst component obtained by connecting a portion of a base material forming the base material-integrated nanocrystalline metal oxide composite-containing catalyst to a carrier.

The forth aspect of the present disclosure includes a catalyst component obtained by connecting a portion of a nanocrystalline metal oxide composite forming the base material-integrated nanocrystalline metal oxide composite-containing catalyst to a carrier.

The present disclosure can provide a base material-integrated nanocrystalline metal oxide composite-containing catalyst including: a base material; and a nanocrystalline metal oxide composite having a plurality of accumulated flake-like nanocrystalline pieces in a connected state on a surface of the base material, the flake-like nanocrystalline pieces each having a main surface and an end surface and containing a metal oxide, wherein: the nanocrystalline metal oxide composite is configured such that, when two adjacent nanocrystalline pieces are viewed, an end surface of at least one of the nanocrystalline pieces is connected; the nanocrystalline pieces include a plurality of stacked surfaces stacked in a direction in which the main surface becomes an uppermost stacked surface; and when metal atoms or oxygen atoms forming the metal oxide are regarded as main constituent atoms, a proportion by number of the main constituent atoms to the metal atoms and the oxygen atoms forming the metal oxide existing on each stacked surface is 80% or more, and the main constituent atoms have a specific crystal orientation which changes in each stack. Thereby, the surface area of the main surface (active surface) can be effectively enlarged; the nanocrystalline pieces connected to the base material do not readily detach, the entire shape thereof can be maintained and excellent catalytic activity is exhibited even if a force caused by vibration or impact acts thereon.

The present disclosure can provide a method for manufacturing a base material-integrated nanocrystalline metal oxide composite-containing catalyst which shortens a manufacturing time to allow mass production when a seed crystal material is used as a base material.

Furthermore, the present disclosure can provide a catalyst component, in which a portion of a base material and the like forming the catalyst is connected to a carrier, to allow a metal oxide composite to be supported on the carrier by a sufficient support strength with a supported portion having a comparatively narrow surface area ratio, and the surface area of a main surface (active surface) of a nanocrystalline piece forming the metal oxide composite can be effectively enlarged and excellent catalytic activity is exhibited.

BRIEF DESCRIPTION OF DRAWINGS

FIGS. 1A and 1B schematically show one embodiment of a base material-integrated nanocrystalline metal oxide composite-containing catalyst according to the present disclosure.

FIGS. 3A and 3B show an example of an SEM image when a base material-integrated nanocrystalline metal oxide composite-containing catalyst according to the present disclosure is observed with a scanning electron microscope (SEM)

DETAILED DESCRIPTION

Next, preferred embodiments of a base material-integrated nanocrystalline metal oxide composite-containing catalyst according to the present disclosure will be described below.

Figure 1A:
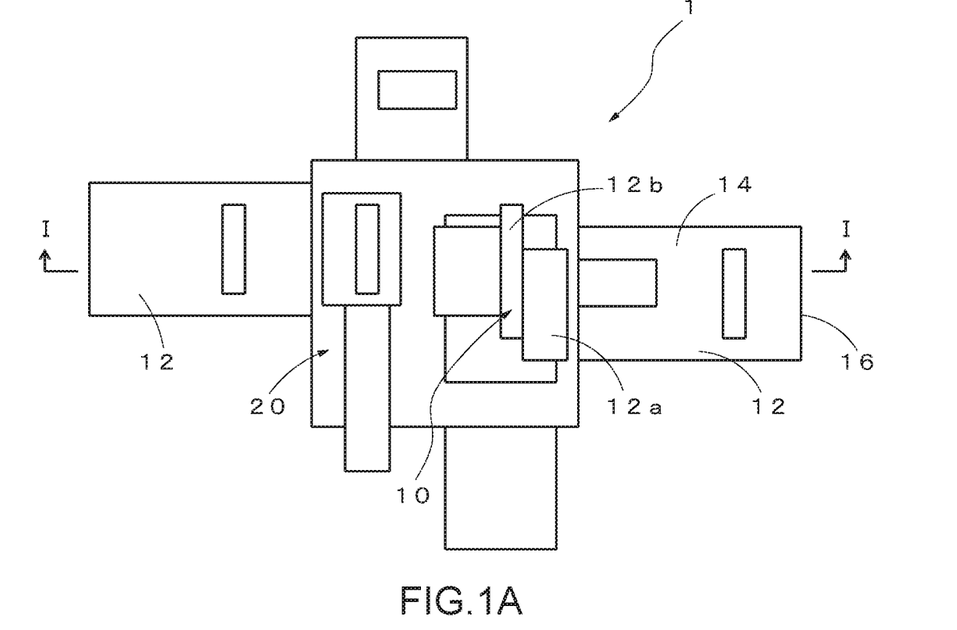
FIG. 1A is a plan (top) view.
Figure 1B:
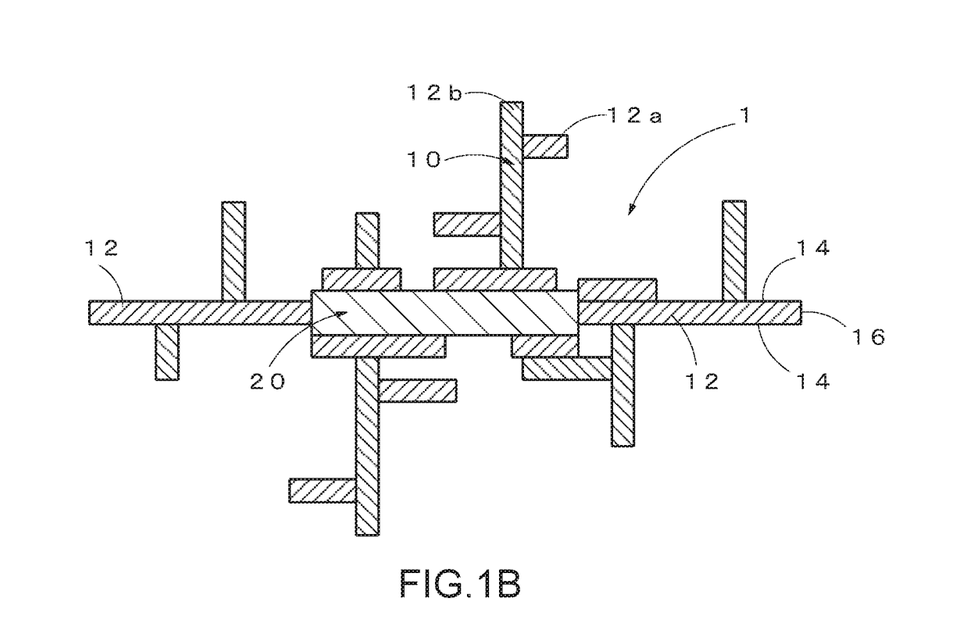
FIG. 1B is a sectional view on line I-I.

FIG. 1 shows an embodiment of a base material-integrated nanocrystalline metal oxide composite-containing catalyst according to the present disclosure. Numeral number 1 in FIG. 1 designates a base material-integrated nanocrystalline metal oxide composite-containing catalyst; numeral number 10 designates a nanocrystalline metal oxide composite; and numeral number 20 designates a base material.

A base material-integrated nanocrystalline metal oxide composite-containing catalyst 1 shown in FIG. 1 mainly contains a nanocrystalline metal oxide composite 10 and a base material 20.

A constitutional main feature of the catalyst 1 of the present disclosure is that a metal oxide catalyst is substituted for at least a part of a precious metal catalyst and the metal oxide catalyst is made finer to nanoparticles, and the metal oxide catalyst 10 is constituted by using the base material 20 and is formed by accumulating a plurality of flake-like nanocrystalline pieces 12, 12, . . . having a main surface 14 having a specific crystal orientation and containing a metal oxide in a connected state on the surface of the base material 20 in a predetermined positional relationship. More specifically, the nanocrystalline metal oxide composite 10 is configured such that, when two adjacent nanocrystalline pieces 12a and 12b are viewed, an end surface 16 of at least one nanocrystalline piece 12a is connected. The nanocrystalline piece 12a includes a plurality of stacked surfaces stacked in a direction in which the main surface 14 becomes an uppermost stacked surface. When metal atoms or oxygen atoms forming the metal oxide are regarded as main constituent atoms, the proportion by number of the main constituent atoms to the metal atoms and the oxygen atoms forming the metal oxide existing on each stacked surface is 80% or more, and the main constituent atoms have a specific crystal orientation which changes in each stack. By employing the configuration, the surface area of the main surface (active surface) 14 can be effectively enlarged; the nanocrystalline pieces 12a, 12b, . . . do not readily detach, the entire shape thereof can be maintained and excellent catalyst activity can be exhibited even if a force caused by vibration or impact acts on the nanocrystalline pieces.

Herein, "an end surface 16 of at least one nanocrystalline piece 12a is connected" is intended to specifically include both a case where the end surface 16 of the nanocrystalline piece 12a of two adjacent nanocrystalline pieces 12a and 12b is connected to the main surface 14 of the nanocrystalline piece 12b and a case where the end surfaces 16 of both the nanocrystalline pieces 12a and 12b are connected to each other.

The nanocrystalline metal oxide composite 10 means a portion which is formed by accumulating the plurality of nanocrystalline pieces 12 in a connected state on the surface of the base material 20, does not contain the base material 20, and is configured from the whole of the plurality of accumulated nanocrystalline pieces 12.

The nanocrystalline piece 12 contains a metal oxide, has a main surface 14 and an end surface 16, and has a flake-like shape. The main surface 14 preferably has a maximum length in the range of 10 nm to 10 μm and a minimum length in the range of 1 nm to 1 μm. The end surface 16 preferably has a height in the range of 1 to 50 nm. The surface area ratio of the main surface 14 to the end surface 16 in the nanocrystalline piece 12 is preferably 20 times or more in that excellent catalytic activity is produced thereby.

The maximum length and the minimum length of the main surface 14 can be defined based on a pair of parallel lines and two other parallel lines perpendicular to the pair of parallel lines among pairs of parallel lines circumscribing the main surface 14 in a two-dimensional shape. The maximum length of the main surface 14 is defined as a distance between the pair of parallel lines selected so as to maximize the distance between the pair of parallel lines circumscribing the main surface 14. The minimum length of the main surface 14 is defined as a distance between the pair of parallel lines selected so as to maximize the distance between the pair of parallel lines perpendicular to the pair of parallel lines used for the determination of the maximum length of the main surface 14.

A metal forming the metal oxide preferably contains one or two or more selected from the group of transition metals since the transition metals are more inexpensive than a precious metal catalyst, and exist in abundance as metal resources on the earth. Among the transition metals, particularly, one or two or more metals selected from copper (Cu), nickel (Ni), cobalt (Co), and zinc (Zn) are more preferable.

In the present disclosure, particularly, the nanocrystalline pieces 12a, 12b include a plurality of stacked surfaces stacked in a direction in which the main surface 14 becomes an uppermost stacked surface. When metal atoms or oxygen atoms forming the metal oxide are regarded as main constituent atoms, the proportion by number of the main constituent atoms to the metal atoms and the oxygen atoms forming the metal oxide existing on each stacked surface may be 80% or more, and the main constituent atoms may have a specific crystal orientation which changes in each stack.

Herein, specifically, the main surface 14 of the nanocrystalline piece 12 means two surfaces each having a large surface area among external surfaces of the flake-like nanocrystalline piece 12 and division-forming the upper and lower end edges of an end surface 16 having a narrow surface area. In the present disclosure, the main surface 14 has a specific crystal orientation in order to serve as an active surface.

In a specific configuration for the main surface 14 serving as the active surface, for example, when the main surface is formed as the active surface of a reduction catalyst for reducing nitrogen oxide ($NO_x$) such as $N_2O$ to $N_2$, the metal atoms as the main constituent atoms exhibiting catalyst activity among the metal atoms and the oxygen atoms forming the metal oxides may be oriented so as to be densely located on the main surface 14 to constitute the main surface 14 from a metal atom actor face mainly containing the metal atoms. Specifically, the proportion by number of the metal atoms to the metal atoms and the oxygen atoms forming the metal oxide existing on the main surface 14 is set to 80% or more. When the main surface is formed as the active surface of the oxide catalyst adsorbing carbon monoxide (CO) to oxidize the carbon monoxide to carbon dioxide ($CO_2$), or adsorbing hydrocarbon (HC) to oxidize the hydrocarbon to $CO_2$ and $H_2O$, the faces of the oxygen atoms which are the main constituent atoms exhibiting catalyst activity among the metal atoms and the oxygen atoms forming the metal oxide may be oriented so as to be densely located on the main surface 14 to constitute the main surface 14 from an oxygen atom actor face mainly containing the oxygen atoms. Specifically, the proportion by number of the metal atoms to the metal atoms and the oxygen atoms forming the metal oxide existing on the main surface 14 is set to 20% or less, that is, the proportion by number of the oxygen atoms is set to 80% or more.

This is because when the proportion by number of the metal atoms which are the main constituent atoms to the metal atom and the oxygen atoms forming the metal oxides existing on the main surface 14 of the nanocrystalline piece 12 is less than 80% (in this case, the proportion by number of the oxygen atoms is more than 20%), the presence ratio of the oxygen atoms having a poor active function of the reduction catalyst, or no active function of the reduction catalyst on the main surface 14 is excessively increased, so that sufficient catalyst activity cannot be exhibited as the nanocrystalline piece, and therefore, the nanocrystalline metal oxide composite 10.

This is because when the proportion by number of the oxygen atoms as the main constituent atoms to the metal atom and the oxygen atoms forming the metal oxides existing on the main surface 14 of the nanocrystalline piece 12 is less than 80% (in this case, the proportion by number of the metal atoms is more than 20%), the presence ratio of the metal atoms having a poor active function of the oxide catalyst, or no active function of the oxide catalyst on the main surface 14 is excessively increased, so that sufficient catalyst activity cannot be exhibited as the nanocrystalline piece, and therefore, the nanocrystalline metal oxide composite 10.

The main surface of the nanocrystalline piece has the specific crystal orientation. A main crystal orientation on the main surface varies with the type of the metal oxide forming the nanocrystalline piece. For this reason, a crystal orientation of the main surface is not specifically described. For example, when the metal oxide is copper oxide (CuO), the main crystal orientation of a single crystal forming the main surface is preferably [001].

When constituting the main surface 14 from the metal atom layer, the metal atom layer is preferably located on the main surface 14 as a rule structure where the metal atom layer and an oxygen atom layer are regularly stacked alternately in the crystal structure of a metal oxide so that atoms are arranged in a regular manner. Specifically, the case where the metal atom layer exists on the main surface 14 includes not only a case of a structure where the main surface 14 contains an aggregate of single crystals having the same orientation but also a case of a structure where the main surface 14 contains an aggregate of single crystals having different crystal structures or different orientations, or an aggregate containing crystal grain boundaries or polycrystals.

The percentage of the area of the main surface 14 of the nanocrystalline piece 12 covered by connection thereof to the other adjacent nanocrystalline piece 14 is preferably in the range of 5 to 20%. This is because, when the percentage of the area is less than 5%, the bond strength of the other adjacent nanocrystalline piece 14 is not sufficiently obtained to readily cause detachment, and when the percentage of the area is more than 20%, the surface area of the main surface 14 which is the active surface tends to become insufficient.

In the nanocrystalline metal oxide composite 10, the plurality of nanocrystalline pieces 12, 12, . . . are preferably in a dendrite-like (dendritic) connected state in that the surface area of the main surface 14 can be effectively secured.

The base material 20 may be a material used in order to accumulate a plurality of nanocrystalline pieces forming the nanocrystalline metal oxide composite 10 in a connected state, and have a surface property in which the plurality of nanocrystalline pieces can be accumulated in a connected state. For example, the base material is preferably a seed crystal material having a surface promoting growth of the nanocrystalline piece 12 so that the main surface 14 of the nanocrystalline piece 12 has a specific crystal orientation, but not particular limited thereto. By using the seed crystal material for the base material 20, the nanocrystalline piece 12 having the main surface having a specific orientation can be preferentially grown from the surface of the base material 20 in a short time, and the base material-integrated nanocrystalline metal oxide composite-containing catalyst 1 is readily manufactured. Furthermore, the productivity of the base material-integrated nanocrystalline metal oxide composite-containing catalyst 1 can also be markedly improved.

The shape of the base material 20 may not be particularly limited, and the shape may be a polyhedron shape in addition to a hexahedron shape such as a cube or a rectangular parallelepiped. Particularly, since the surface of the base material having a concavo-convex shape promotes nucleation, it may be preferable to control the roughness of the surface of the base material (for example, control the number of minute unevennesses and the like), or to form the base material 20 in a mesh state.

Figure 2:
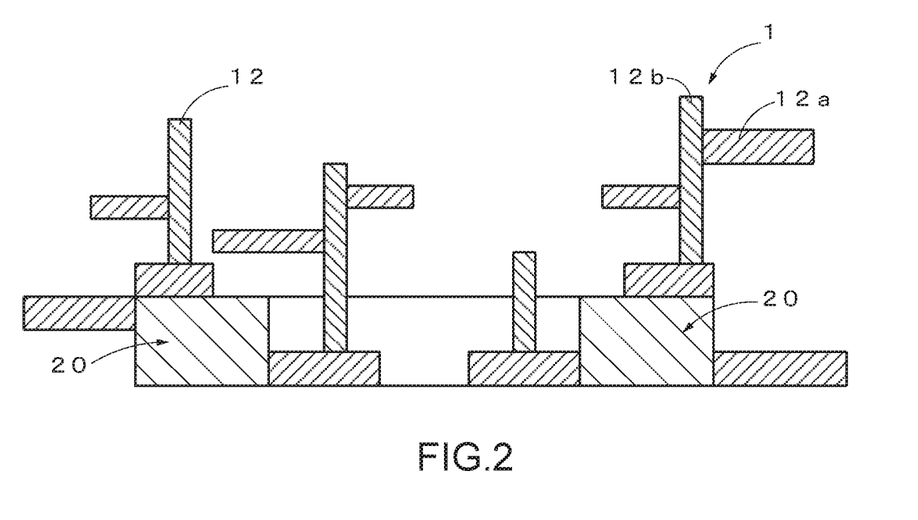
FIG. 2 is a sectional view schematically showing another embodiment of a base material-integrated nanocrystalline metal oxide composite-containing catalyst according to the present disclosure.

Examples of the shape of the base material-integrated nanocrystalline metal oxide composite-containing catalyst 1 include a shape obtained by growing the nanocrystalline piece 12 from the whole surface of the base material, as shown in FIG. 1, and a shape obtained by growing the nanocrystalline piece 12 from the surface of the base material, as shown in FIG. 2. It may be preferable that the number of the nanocrystalline pieces 12 preferentially grown from the surface of the base material and connected in a dendrite form is less likely to cause the detachment of the nanocrystalline pieces 12 from the base material and can provide the expectation of an increase in a surface area. Specifically, the total of the surface areas of the nanocrystalline pieces 12 is suitably twice or more and 20 times or less of that of the base material.

Figure 3A:
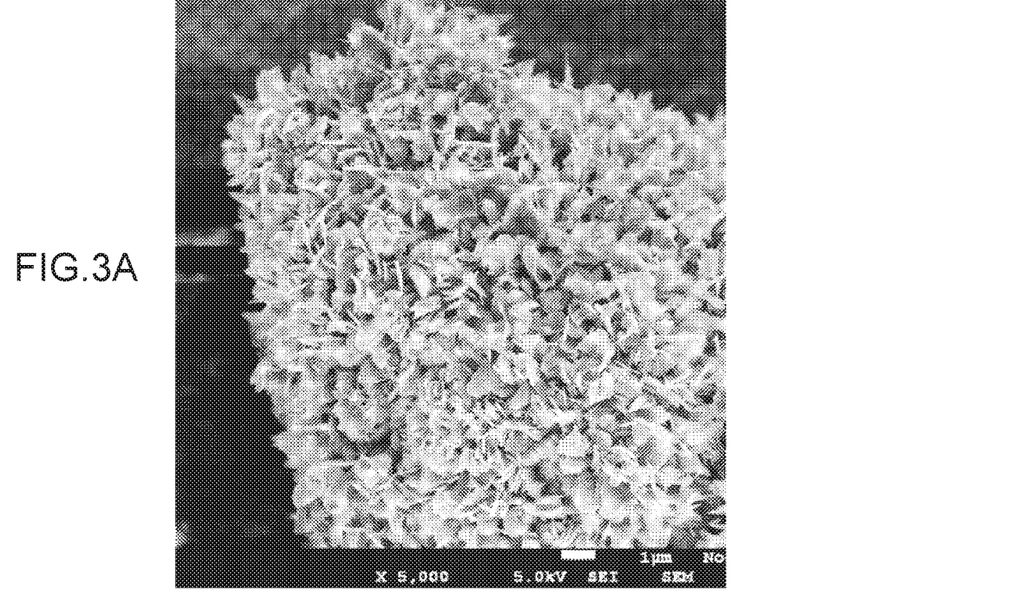
FIG. 3A shows an SEM image taken at a magnification of 5000×.
Figure 3B:
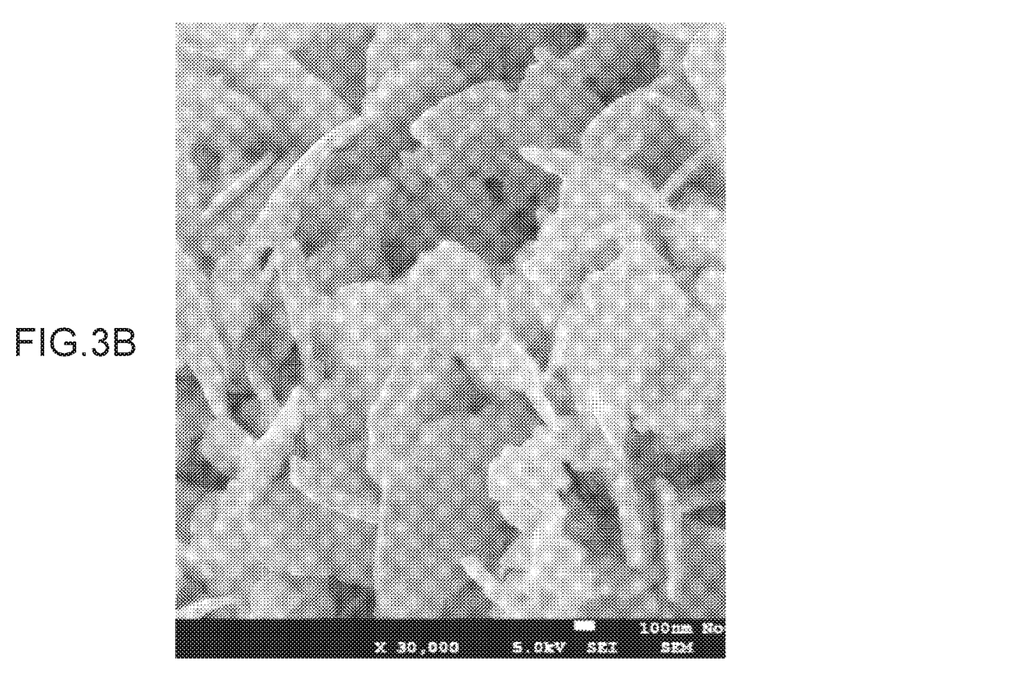
FIG. 3B shows an SEM image taken at a magnification of 30000×.

FIG. 3A and FIG. 3B are an example of an SEM image when a copper oxide catalyst which is the base material-integrated nanocrystalline metal oxide composite-containing catalyst of the present disclosure produced using a nano copper small piece as a base material is observed with a scanning electron microscope (SEM). FIG. 3A shows an SEM image taken at a magnification of 5000×, and FIG. 3B shows an SEM image taken at a magnification of 30000×. The SEM images shown in FIG. 3A and FIG. 3B show that, in the base material-integrated nanocrystalline metal oxide composite-containing catalyst of the present disclosure, the nanocrystalline pieces forming the nanocrystalline metal oxide composite have a flake-like shape, and when two adjacent nanocrystalline pieces are viewed, the end surface of at least one of the nanocrystalline pieces is connected.

It may be preferable that the base material-integrated nanocrystalline metal oxide composite-containing catalyst 1 further contains a nanocrystalline metal body made of one or two or more metals or alloys selected from Pd, Rh, Ru, Pt, Ag, and Au.

As the nanocrystalline metal body, one formed as spherical nanoparticles having a smooth surface as with the conventional precious metal catalyst may be used. The nanocrystalline metal body is also preferably formed so as to have the same shape as that of the metal oxide composite from the viewpoint of increasing the surface area of the active surface.

For example, when a seed crystal material is used as a base material, a method for manufacturing the base material-integrated nanocrystalline metal oxide composite-containing catalyst of the present disclosure preferably includes the step of preferentially growing a nanocrystalline piece in a direction in which a main surface has a specific crystal orientation from the surface of the base material to accumulate a plurality of nanocrystalline pieces in a connected state on the surface of the base material to integrally form a nanocrystalline metal oxide composite.

Examples of the step of integrally forming such a nanocomposite include the step of applying a high temperature and a high pressure to an alcohol and a halide of a metal or alloy thereof as raw materials by a hydrothermal synthesizing (hydrothermal) method.

Figure 4:
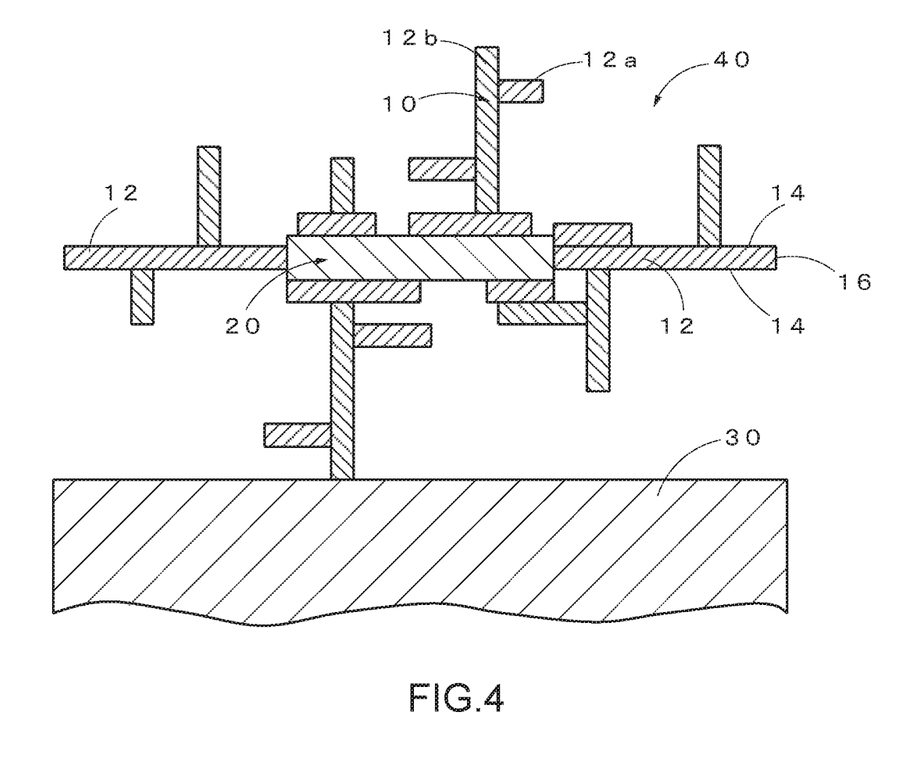
FIG. 4 is a sectional view schematically showing an embodiment of a catalyst component according to the present disclosure.
Figure 5:
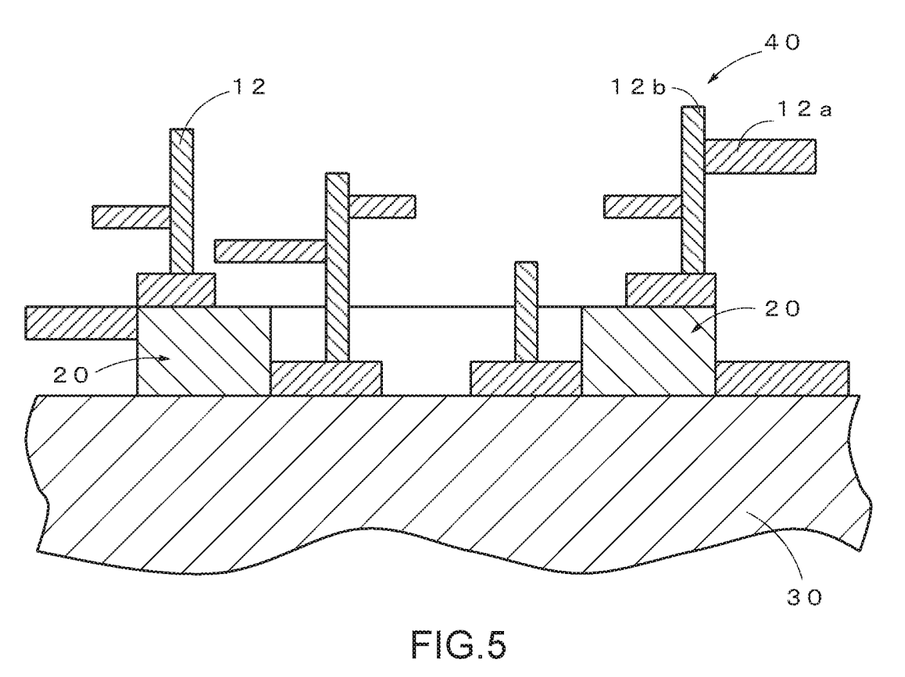
FIG. 5 is a sectional view schematically showing another embodiment of the catalyst component according to the present disclosure.

Furthermore, as shown in FIG. 4, in a catalyst component 40 of the present disclosure, a portion of the nanocrystalline metal oxide composite (more strictly, one end of the nanocrystalline piece) forming the catalyst shown in FIG. 1 is preferably connected to the carrier 30 having a cell structure (honeycomb structure). Alternatively, as shown in FIG. 5, a portion of the base material forming the catalyst shown in FIG. 2 is preferably connected. A method for manufacturing the catalyst component is not particularly limited. For example, the catalyst component 40 can be manufactured by immersing a carrier 30 containing a porous ceramic material into an aqueous solution in which base material-integrated nanocrystalline metal oxide composite-containing catalyst particles and ceramic particles made of alumina ($Al_2O_3$) and silica ($SiO_2$) and the like are dispersed, pulling up the carrier 30, and thereafter drying or firing (sintering) the carrier 30. Alternatively, the catalyst component 40 can be manufactured by a wash coat treatment for immersing a carrier 30 to which a base material 20 is previously connected into an aqueous solution in which nanocrystalline metal oxide catalyst particles and ceramic particles made of alumina ($Al_2O_3$) and silica ($SiO_2$) and the like are dispersed, pulling up the carrier 30, and thereafter drying or firing (sintering) the carrier 30. In addition, the catalyst component 40 can be manufactured by using various surface coating techniques such as wet type plating, dry type plating, and a sol gel method.

EXAMPLES

Hereinafter, the present disclosure will be described in more detail with reference to Examples, but the present disclosure is not limited thereto.

Example 1

500 mg of nano copper small pieces (base material) having a square of 100 nm and a thickness of 2 nm were mixed with 1 g of copper(II) chloride dihydrate and 0.8 g of urea to obtain a mixture. Thereafter, to the mixture, 80 cc of ethylene glycol and 120 cc of water were added to obtain a mixed solution. The mixed solution was heat-treated at 150° C. for 5 hours during stirring. Thereafter, the heat-treated mixture was washed with pure water, and vacuum-dried at 70° C. under vacuum for 10 hours to obtain a copper oxide catalyst which was a base material-integrated nanocrystalline metal oxide composite-containing catalyst in which 200 mg of a nanocrystalline metal oxide composite made of a copper oxide nanocrystalline piece existed on the surface of the base material.

The form of fine particles forming the obtained copper oxide catalyst powder was observed using a scanning transmission electron microscope (SEM). When the obtained electron microscope image was observed, a small piece (flake) group in which the nanocrystalline pieces grew from the nanocrystalline pieces was observed. Furthermore, from a high resolution lattice image, the surface of the nanocrystalline piece was a (001) plane, and was equivalent to a crystal face in which copper and oxygen were alternately stacked. 95% or more of oxygen atoms existed on a main surface, and the individual nanocrystalline pieces forming the copper oxide catalyst were generally single crystals.

Example 2

The copper oxide catalyst obtained in Example 1 was placed in a container, subjected to vacuum deaeration, and heated at 150° C. for 1 hour. Into the container in which 700 mg of the copper oxide catalyst was placed, 4.0 mg of a chloroplatinic acid [$H_2PtCl_6 \cdot (H_2O)_6$] powder was added at room temperature, followed by mixing to obtain a mixture. Thereafter, the mixture was stirred under a nitrogen atmosphere at 150° C. for 1 hour, and stirred while being held under a hydrogen atmosphere at 250° C. for 1 hour, to obtain a nanocrystalline platinum-containing copper oxide catalyst which was a base material-integrated nanocrystalline metal oxide composite-containing catalyst.

Example 3

On the surface of a carrier having a square of 100 nm and a thickness of 2 nm and made of alumina ($Al_2O_3$), copper was deposited so as to have a thickness of 10 nm and a line width of 100 nm in a mesh form having a mesh interval of 1 μm by electroless plating, and heat-treated at 100° C. in atmospheric air for 1 hour to provide a base material containing an oxide coating having a thickness of 1 nm. The carrier on which the base material was provided was mixed with 1 g of copper (II) chloride dihydrate and 0.8 g of urea to obtain a mixture. Thereafter, to the mixture, 80 cc of ethylene glycol and 120 cc of water were added to obtain a mixed solution. The mixed solution was heat-treated at 150° C. for 5 hours during stirring. Thereafter, the heat-treated mixture was washed with pure water, and vacuum-dried at 70° C. under vacuum for 10 hours to obtain a carrier having a surface on which a copper oxide catalyst was provided, as a base material-integrated nanocrystalline metal oxide composite-containing catalyst in which a nanocrystalline metal oxide composite made of a copper oxide nanocrystalline piece existed on the surface of the base material. The form of fine particles forming the obtained copper oxide catalyst powder was observed using a scanning transmission electron microscope (STEM). When the obtained electron microscope image was observed, a small piece (flake) group in which the nanocrystalline pieces grew from the nanocrystalline pieces was observed. Furthermore, from a high resolution lattice image, the surface of the nanocrystalline piece was a (001) plane, and was equivalent to a crystal face in which copper and oxygen were alternately stacked. 95% or more of oxygen atoms existed on the main surface, and the individual nanocrystalline pieces forming the copper oxide catalyst were generally single crystals.

Comparative Example 1

1 g of copper(II) chloride dehydrate and 0.8 g of urea were mixed to obtain a mixture. Thereafter, to the mixture, 80 cc of ethylene glycol and 120 cc of water were added to obtain a mixed solution. The mixed solution was heat-treated at 150° C. for 5 hours during stirring. Thereafter, the heat-treated mixture was washed with pure water, and vacuum-dried at 70° C. under vacuum for 10 hours to obtain a copper oxide catalyst made of a copper oxide nanocrystalline piece. It could be confirmed that the amount of the copper oxide catalyst which can be produced in the same time as that in Example 1 is 1/10 or less of that in Example 1, or 10 mg, and the manufacturing method of Example 1 has better mass productivity.

Comparative Example 2

In order to evaluate the performance of a catalyst material, and to produce the same amount as 200 mg of the oxide catalyst of Example 1, 1 g of copper (II) chloride dihydrate and 0.8 g of urea were mixed to obtain a mixture. Thereafter, to the mixture, 80 cc of ethylene glycol and 120 cc of water were added to obtain a mixed solution. The mixed solution was heat-treated at 150° C. for 5 hours during stirring. Thereafter, the heat-treated mixture was washed with pure water, and vacuum-dried at 70° C. under vacuum for 10 hours to obtain a powdered copper oxide catalyst in which copper oxide nanocrystalline pieces accumulated.

Comparative Example 3

By a thermal plasma method, 200 mg of copper oxide nanoparticles having an average particle size of 100 nm were produced as a comparative sample. In Comparative Example 3, the spherical copper oxide nanoparticles aggregated.
(Evaluation)
The catalyst activity of each of the catalysts obtained in Examples 1 to 3 and Comparative Examples 2 and 3 was evaluated according to the following method. A sample adjusted so that the amount of a catalyst portion excluding each of the carriers was set to 200 mg was installed in a mass spectroscope attached temperature-programmed desorption apparatus, and heated from room temperature to 200° C. at a heating rate of 15° C./min while a model gas containing $C_3H_6$ (2000 ppmC), $O_2$ (667 ppm), and He (remainder) was supplied at a flow of 60 mL/min. The cleaning rates of $C_3H_6$ in the model gas were measured when the temperature of the supplied model gas reached 100° C. and 180° C. Thereafter, the temperature process returning to room temperature was regarded as 1 cycle, and from the cleaning rates after 1000 cycles of repetitions, the deterioration rates of the catalysts were evaluated. The measurement results of the cleaning rates are shown in Table 1.

TABLE 1

| | Cleaning rate (%) | | | |
|---|---|---|---|---|
| | After 1 cycle | | After 1000 cycles | |
| | 100° C. | 180° C. | 100° C. | 180° C. |
| Example 1 | 15 | 50 | 13 | 49 |
| Example 2 | 25 | 55 | 20 | 54 |
| Example 3 | 25 | 58 | 24 | 57 |
| Comparative Example 2 | 15 | 52 | 8 | 34 |
| Comparative Example 3 | 5 | 10 | 1 | 1 |

From the measurement results shown in Table 1, it was confirmed that all of the catalysts of Examples 1 to 3 had markedly higher cleaning rates of $C_3H_6$ at both temperatures of 100° C. and 180° C. and both temperature cycles than those in Comparative Example 3. It was confirmed that the cleaning rate after 1 cycle of each of the catalysts of Examples 1 to 3 is equal to or greater than that of Comparative Example 2, and the catalysts of Examples 1 to 3 have less deterioration after 1000 cycles. Furthermore, it was observed that the cleaning rate of $C_3H_6$ of Example 3 as the carrier having a surface on which the copper oxide catalyst of Example 1 is provided is still higher than that of Example 1. Therefore, it was confirmed that the automobile exhaust cleaning catalyst of the present disclosure has high catalyst activity also in a low-temperature region.

The present disclosure can provide a base material-integrated nanocrystalline metal oxide composite-containing catalyst in which the surface area of a main surface (active surface) can be effectively enlarged; and in which nanocrystalline pieces do not readily detach, the entire shape thereof can be maintained and excellent catalytic activity is exhibited even if a force caused by vibration or impact acts on the nanocrystalline pieces. Particularly, the base material-integrated nanocrystalline metal oxide composite-containing catalyst is expected to be applied to wide range of fields such as a fuel cell electrode for a fuel cell vehicle, a hydrogen infrastructure catalyst for transporting/storing hydrogen using an organic hydride, and a photocatalyst in addition to a catalyst component such as a catalytic converter for a vehicle engine.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A base material-integrated nanocrystalline metal oxide composite-containing catalyst, the catalyst comprising:
   a base material; and
   a nanocrystalline metal oxide composite having a plurality of accumulated nanocrystalline pieces in a connected state on a surface of the base material, the nanocrystalline pieces each having a main surface and an end surface and containing a metal oxide,
   wherein:
   the nanocrystalline metal oxide composite is configured such that, when two adjacent nanocrystalline pieces are viewed, an end surface of at least one of the nanocrystalline pieces is connected;
   the nanocrystalline pieces include a plurality of stacked surfaces stacked in a direction in which the main surface becomes an uppermost stacked surface; and
   when metal atoms or oxygen atoms forming the metal oxide are regarded as main constituent atoms, a proportion by number of the main constituent atoms to the metal atoms and the oxygen atoms forming the metal oxide existing on each stacked surface is 80% or more, and the main constituent atoms have a specific crystal orientation which changes in each stack.

2. The base material-integrated nanocrystalline metal oxide composite-containing catalyst according to claim 1, wherein a metal forming the metal oxide contains one or two or more metals selected from a group consisting of Cu, Ni, Co, and Zn.

3. The base material-integrated nanocrystalline metal oxide composite-containing catalyst according to claim 1, further comprising a nanocrystalline metal body containing one or two or more metals or alloys selected from a group consisting of Pd, Rh, Ru, Pt, Ag, and Au.

4. The base material-integrated nanocrystalline metal oxide composite-containing catalyst according to claim 1, wherein a percentage of an area of the main surface of the nanocrystalline piece covered by connection thereof to another adjacent nanocrystalline piece is in the range of 5 to 20%.

5. The base material-integrated nanocrystalline metal oxide composite-containing catalyst according to claim 1, wherein the nanocrystalline metal oxide composite is configured such that the plurality of nanocrystalline pieces are in a dendritic connected state.

6. The base material-integrated nanocrystalline metal oxide composite-containing catalyst according to claim 1, wherein the base material is a seed crystal material having a surface promoting growth of the nanocrystalline piece so that the main surface of the nanocrystalline piece has the specific crystal orientation.

7. A method for manufacturing the base material-integrated nanocrystalline metal oxide composite-containing catalyst according to claim 6, the method comprising a step of:
   preferentially growing the nanocrystalline piece from a surface of the base material to accumulate the plurality of nanocrystalline pieces in a connected state on the surface of the base material to integrally form the nanocrystalline metal oxide composite.

8. A catalyst component obtained by connecting a portion of a base material forming the base material-integrated nanocrystalline metal oxide composite-containing catalyst according to claim 1 to a carrier.

9. A catalyst component obtained by connecting a portion of a nanocrystalline metal oxide composite forming the base material-integrated nanocrystalline metal oxide composite-containing catalyst according to claim 1 to a carrier.

* * * * *